US009372503B1

(12) United States Patent
Miller et al.

(10) Patent No.: US 9,372,503 B1
(45) Date of Patent: Jun. 21, 2016

(54) CLOCK SIGNAL ALIGNMENT FOR SYSTEM-IN-PACKAGE (SIP) DEVICES (71) Applicant: FREESCALE SEMICONDUCTOR, INC., Austin, TX (US)

(72) Inventors: Gary L. Miller, Austin, TX (US); James G. Gay, Pflugerville, TX (US); Gilford E. Lubbers, Dripping Springs, TX (US); Geng Zhong, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/719,549

(22) Filed: May 22, 2015

(51) Int. Cl.
*G06F 1/12* (2006.01)
*G06F 1/10* (2006.01)
*G06F 13/16* (2006.01)
*G06F 17/50* (2006.01)
*H03K 19/177* (2006.01)
*H03K 5/135* (2006.01)

(52) U.S. Cl.
CPC .. *G06F 1/12* (2013.01); *G06F 1/10* (2013.01); *G06F 13/1689* (2013.01); *G06F 17/5077* (2013.01); *H03K 5/135* (2013.01); *H03K 19/17736* (2013.01)

(58) Field of Classification Search
CPC ......... G06F 1/10; G06F 1/12; G06F 13/1689; G06F 17/5077; H04L 7/0037; H04L 7/0012; H04L 7/0008; H04L 7/0041; G01R 31/318552; G01R 31/31922; G01R 31/31727; G11C 7/222; G11C 7/225; H03K 19/17736; H03K 5/135; H03K 5/1506; H03K 23/40; H03K 23/58

See application file for complete search history.

(56) References Cited

U.S. PATENT DOCUMENTS

| 5,625,805 | A * | 4/1997 | Fenwick | G06F 1/10 713/503 |
| 5,712,882 | A * | 1/1998 | Miller | G01R 31/31922 327/153 |
| 5,742,798 | A * | 4/1998 | Goldrian | G06F 1/10 713/400 |
| 6,532,576 | B1 * | 3/2003 | Mbouombouo | G06F 17/5022 716/108 |
| 7,130,367 | B1 | 10/2006 | Fu et al. | |
| 7,139,348 | B1 | 11/2006 | Fu et al. | |
| 7,256,627 | B1 * | 8/2007 | Talbot | G06F 1/12 327/141 |
| 7,345,948 | B2 * | 3/2008 | Oh | G11C 11/419 365/191 |
| 7,551,002 | B1 | 6/2009 | Reuland et al. | |
| 7,739,537 | B2 | 6/2010 | Albonesi et al. | |
| 8,996,906 | B1 * | 3/2015 | Townley | G06F 1/10 326/101 |
| 9,191,193 | B1 * | 11/2015 | Huang | H04L 7/0331 |
| 2002/0073389 | A1 * | 6/2002 | Elboim | G06F 1/10 716/114 |
| 2008/0204104 | A1 | 8/2008 | Peng | |
| 2013/0039144 | A1 | 2/2013 | Gomm | |

* cited by examiner

*Primary Examiner* — Vibol Tan (57) ABSTRACT

A method embodiment of the present disclosure includes receiving a delay value associated with an interconnect delay that is measured across interconnect circuitry communicatively coupling a host semiconductor device with a semiconductor device. The method also includes delaying a local clock signal by an amount of delay indicated by the delay value to produce a delayed local clock signal. The method also includes receiving a delayed source clock signal, where the delayed source clock signal is received from the host semiconductor device via the interconnect circuitry. The method also includes outputting a master clock signal based on a comparison of the delayed source clock signal and the delayed local clock signal, where the master clock signal is utilized to generate one or more aligned clock signals on the semiconductor device that are aligned with a source clock signal generated on the host semiconductor device.

22 Claims, 5 Drawing Sheets

CLOCK SIGNAL ALIGNMENT FOR SYSTEM-IN-PACKAGE (SIP) DEVICES

BACKGROUND

1. Field

This disclosure relates generally to system-in-package (SiP) devices, and more specifically, to clock signal alignment across integrated circuits within SiP devices.

2. Related Art

System-in-package (SiP) technology currently attempts to interconnect numerous semiconductor devices within a single semiconductor package. SiP technology includes various interconnect techniques, such as utilizing copper pillar interconnects, flip-chip interconnects, interconnect fabric such as interposers, and the like.

BRIEF DESCRIPTION OF THE DRAWINGS

The present invention may be better understood, and its numerous objects, features, and advantages made apparent to those skilled in the art by referencing the accompanying drawings.

The present invention is illustrated by way of example and is not limited by the accompanying figures, in which like references indicate similar elements, unless otherwise noted. Elements in the figures are illustrated for simplicity and clarity and have not necessarily been drawn to scale.

DETAILED DESCRIPTION

The following sets forth a detailed description of various embodiments intended to be illustrative of the invention and should not be taken to be limiting.

Overview

An integrated circuit often includes synchronous elements, or elements that must be synchronized using a clock signal. As the clock signal is distributed to the elements in the integrated circuit via a clock distribution network, the clock signal may arrive at the elements at different times due to various factors affecting the clock signal, such as differing path length to the elements, temperature variation, electromagnetic interference, resistive-capacitive coupling, propagation delays of buffers used in the clock distribution network, and the like. In order for the integrated circuit to operate properly, such clock skew must be reduced by balancing the clock signal across the integrated circuit to ensure that the synchronous elements receive logic level changes of the clock signal simultaneously.

System-in-package (SiP) technology currently attempts to interconnect numerous different types of semiconductor devices (or SiP devices) within a single semiconductor package (or SiP package). The integrated circuits of the different SiP devices also include synchronous elements. Many high performance applications require synchronous communication within an SiP package, where the various synchronous elements of the SiP devices must be synchronized. Present solutions often utilize clock domain crossing logic within interfacing logic on each interconnected interface of the SiP devices. However, clock domain crossing can cause significant latency penalties for high performance applications as signals cross from one clock domain to another clock domain and must be synchronized to the destination clock domain.

The present disclosure provides adaptive clock signal alignment across synchronous elements of multiple SiP devices within an SiP package that implements a single clock domain by compensating for interconnect delay. A source clock signal is provided by a master or host device to one or more secondary or expansion devices of an SiP package. The source clock signal, as well as other signals transmitted from device to device, experiences delay when traveling across SiP interconnect circuitry from the host device to a given expansion device, also referred to as interconnect delay. The interconnect delay is compensated for by each expansion device to properly align local clock signal(s) with the host device's source clock signal. Each expansion device includes local synchronous logic that utilizes the local aligned clock signal(s), achieving synchronous communication with the host device's synchronous logic that utilizes the source clock signal.

In some embodiments, the interconnect delay is determined for each expansion device and set before operation of the SiP package (e.g., during factory settings). In other embodiments, the interconnect delay is dynamically (e.g., on the fly) determined by each expansion device during operation of the SiP package. In both types of embodiments, adaptive clock signal alignment compensates for the interconnect delay and automatically adjusts a local clock signal to be aligned with the source clock signal of the host device. In this manner, the present disclosure provides a flexible and low latency solution for partitioning synchronous elements within the same clock domain onto multiple SiP devices, where the SiP devices achieve synchronous communication at high speeds (e.g., greater than or equal to 1 GHz), even for differing SiP technologies.

Example Embodiments

Figure 1:
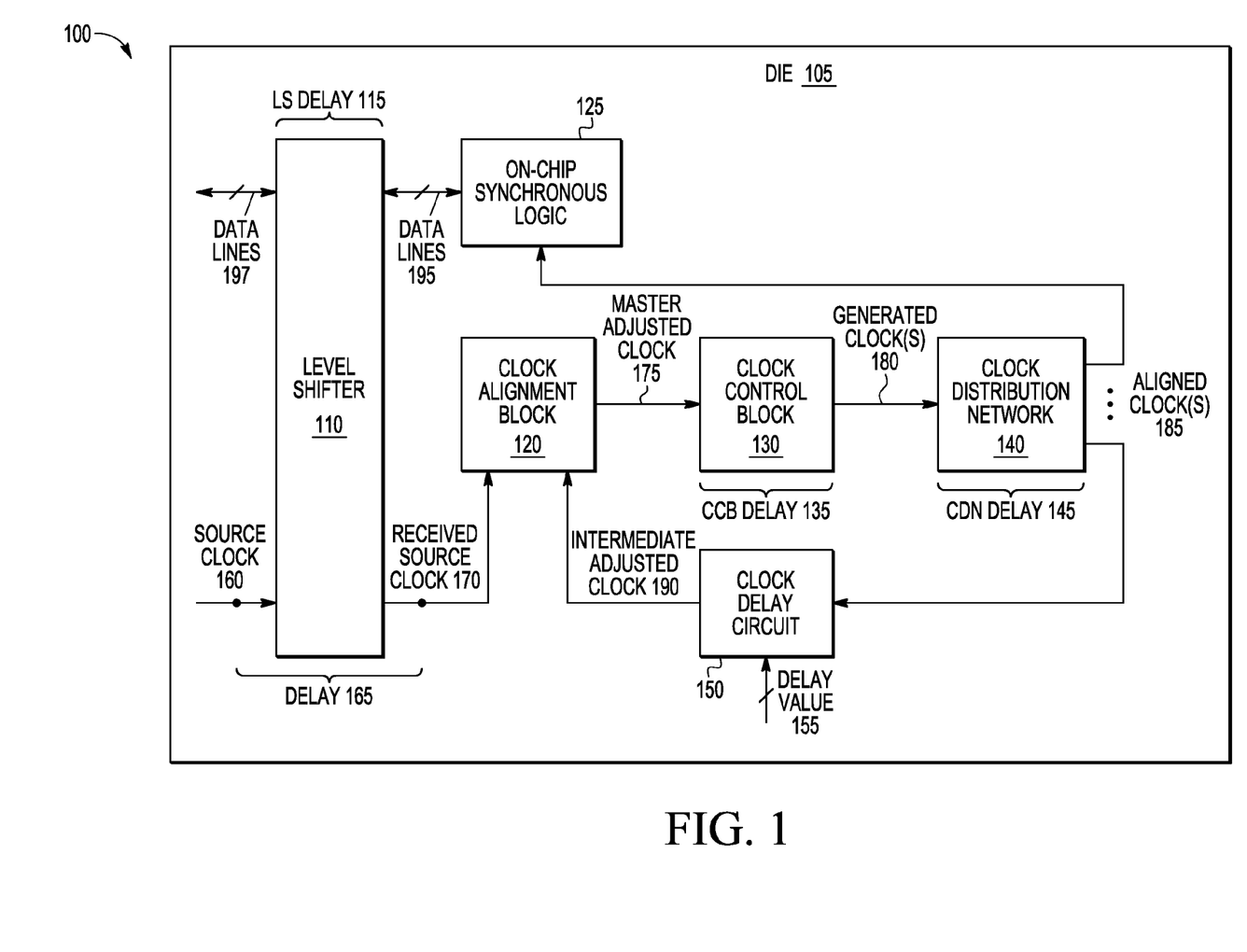
FIG. 1-3 illustrate block diagrams depicting example semiconductor devices in which the disclosure is implemented, according to some embodiments.

FIG. 1 illustrates a simplified block diagram depicting an example semiconductor device 105 of a system 100 in which the disclosure is implemented. In some embodiments, semiconductor device 105 is a die 105 that is part of an expansion device included in a system-in-package (SiP) package, which also includes a host die (not shown). In other embodiments, semiconductor device 105 and a host semiconductor device are part of a single die, where the semiconductor device 105 and the source semiconductor device are intraconnected devices on the single die. It is noted that semiconductor device 105 is described herein as die 105 for illustrative purposes, and should not be taken to be limiting. While die 105 includes a great variety of components, many components are omitted in FIG. 1 to maintain simplicity.

Die 105 includes on-chip synchronous logic 125, or integrated circuitry that includes synchronous elements. On-chip synchronous logic 125 is configured to be in synchronous communication with synchronous logic on a host die (not shown) via a number of data lines 195, level shifter 110, and a number of data lines 197. Also, bus and address control lines (not shown) are associated with data lines 195 and 197. An example embodiment of on-chip synchronous logic 125 includes a synchronous bus that is configured to be in synchronous communication with a synchronous bus on the host die, which is further discussed below in connection with FIG. 2.

Die 105 also includes interconnect circuitry configured to provide an interface to communicate with another die, such as a host die. Interconnect circuitry may be any one of various interconnect technologies, such as copper pillar interconnect technology (e.g., for stacked devices), flip-chip interconnect technology (e.g., for flip-chip devices), interconnect fabric (e.g., for some types of SiP devices), and the like. Some embodiments of interconnect technology also include technology translation circuitry, such as level shift circuitry that allows die of different technologies to communicate with one another. The embodiment illustrated in FIG. 1 shows die 105 having interconnect circuitry including technology translation circuitry, which is illustrated as level shifter 110. Level shifter 110 is configured to adjust signals received from a host die (not shown) to a level utilized by internal circuitry of die 105, as well as to adjust outgoing signals to a level utilized by the host die for transmission to the host die. In some embodiments, level shifter 110 translates signals between some standard signal level at the interconnect and an internal signal level utilized by internal circuitry of die 105 when receiving or transmitting such signals. As such, die 105 is agnostic as to the type of die with which die 105 communicates.

Die 105 is configured to receive a source clock signal 160 from a host die. Source clock 160 is input to level shifter 110, which outputs a level shifted version of the source clock 160, also referred to herein as a received source clock signal 170. As source clock 160 travels from the host die to die 105 via interconnect circuitry, source clock 160 experiences delay arising from the interconnect circuitry, also referred to herein as interconnect delay 165. For example, source clock 160 experiences delay 115 from level shifter 110 due to a variety of reasons, including but not limited to propagation delay of logic or buffer circuitry within level shifter 110, signal path length, temperature variation, electromagnetic interference, resistive-capacitive coupling, and the like. As discussed herein, interconnect delay 165 is an amount of delay that is introduced to source clock signal 160 as it travels from a point where source clock 160 is available to synchronous elements on the host die (e.g., is used to clock synchronous logic on host die) through interconnect circuitry (including through level shifter 110) to a point where received source clock signal 170 is available to clock aligning block 120. In the embodiment illustrated in FIG. 1, interconnect delay 165 is modeled to include level shifter (LS) delay 115.

Die 105 also includes a clock alignment loop circuit, which in turn includes a clock aligning block 120, a clock control block 130, a clock distribution network 140, and a clock delay circuit 150. The clock alignment loop circuit includes a generated clock signal path from clock aligning block 120 to clock distribution network 140 (via clock control block 130), and a feedback clock signal path from clock distribution network 140 to clock aligning block 120 (via clock delay circuit 150). The clock alignment loop circuit is configured to align one or more local clock signals, or aligned clock(s) 185 as discussed below, with source clock signal 160 to achieve a single clock domain.

Clock aligning block 120 has two inputs, the received source clock signal 170 and a feedback clock signal received from clock delay circuit 150, which is illustrated as intermediate adjusted clock 190. The feedback clock signal is further discussed below in connection with clock delay circuit 150. Clock aligning block 120 is configured to compare phases of the received source clock signal 170 and the feedback clock signal to determine a delay (or phase difference) exhibited by the feedback clock signal, as compared with the received source clock signal 170. Clock aligning block 120 is also configured to output a master adjusted clock signal 175 whose phase is adjusted in order to compensate for the delay exhibited by the feedback clock signal. Such delay is further discussed below in connection with clock delay circuit 150. Examples of circuitry included in clock aligning block 120 include, but are not limited to, a phase detector, a variable delay line, a variable frequency oscillator, a delay-locked loop (DLL) circuit (e.g., a phase detector coupled with a variable delay line), a phase-locked loop (PLL) circuit (e.g., a phase detector coupled with a variable frequency oscillator), and similar circuitry that is configured to output an adjustable periodic clock signal.

Clock control block 130 is configured to receive master adjusted clock signal 175 and to output one or more generated clock signals 180. One or more generated clock signals 180 may each have a different clock frequency, where each clock signal 180 has a frequency that is some factor (e.g., multiple or fraction) of the frequency of master adjusted clock signal 175. Examples of circuitry included in clock control block 130 include, but are not limited to, clock frequency divider circuits, clock frequency multiplier circuits, and similar circuitry that is configured to receive an input clock signal and generate one or more clock signals based on the frequency of the input clock signal.

Clock distribution network 140 is configured to distribute the one or more generated clock signals 180 as one or more balanced clock signals 185 to synchronous elements of logic circuitry on die 105, including to on-chip synchronous logic 125. Clock distribution network 140 is balanced, where the clock signals are distributed to the synchronous elements in such a way that the synchronous elements receive logic level changes of the clock signals simultaneously. In other words, clock distribution network 140 provides one or more balanced clock signals 185 to on-chip synchronous logic 125. One or more balanced clock signals 185 may be phase aligned with one another. One or more balanced clock signals 185 may each have a different clock frequency, where each clock signal 185 has a frequency that is some factor (e.g., multiple or fraction) of the frequency of master adjusted clock signal 175. Examples of circuitry included in clock distribution network 140 include, but is not limited to, balanced clock trees, buffers to drive synchronous elements (e.g., registers) at the leaves of the clock tree, de-skew circuits, de-jitter circuits, and the like.

Various delay is introduced into the generated clock signal path as one or more clock signals are propagated through logic gate elements of the clock alignment loop circuit, where each logic gate element requires a certain amount of time after an input is received for its output to change. For example, clock control block 130 includes data latches, such as D-type flip flops that include various logic gate elements, where each data latch requires a certain amount of time after a clock edge is received for its output to change, also referred to as clock-to-output propagation delay. The overall propagation delay introduced into generated clocks 180 (as compared with master adjusted clock 175) by clock control block 130 is referred to as CCB (clock control block) delay 135. Additionally, the buffers in clock distribution network 140, which also include various logic gate elements, also each require a certain amount of time to change its output after a clock edge is received. The overall propagation delay introduced into balanced clocks 185 (as compared with generated clocks 180) is referred to as CDN (clock distribution network) delay 145. CCB delay 135 and CDN delay 145 often change during operation of die 105 for a variety of reasons, including but not limited to voltage supply variation, temperature variation, electromagnetic interference, resistive-capacitive coupling, and the like.

Clock delay circuit 150 is configured to receive one of the balanced clock signals 185 (also referred to as a feedback balanced clock signal 185) and to output a delayed version of the feedback balanced clock signal 185 as intermediate adjusted clock signal 190, which is provided to clock aligning block 120 as the feedback clock signal. Clock delay circuit 150 includes a delay element configured to introduce some delay into the feedback balanced clock signal 185 according to delay value 155, which results in intermediate adjusted clock signal 190. Delay value 155 corresponds to the interconnect delay 165 from host die to die 105. In some embodiments, delay value 155 is a delay control signal (e.g., a voltage signal that is proportional to interconnect delay 165) utilized by clock delay circuit 150 to control the delay element (e.g., a variable delay line or a variable frequency oscillator) to introduce a delay time into feedback balanced clock signal 185, where the delay time is equal to interconnect delay 165. In other embodiments, delay value 155 is one or more delay control signals utilized to control one or more delay elements. In still other embodiments, delay value 155 is a delay code or other numerical value that represents the delay time equal to interconnect delay 165. Clock delay circuit 150 is configured to determine a delay control signal corresponding to delay value 155, where the delay control signal is utilized to control the delay element to introduce the delay time (equal to interconnect delay 165) into feedback balanced clock signal 185. In the embodiment illustrated in FIG. 1, delay value 155 is determined at some time before operation of die 105 (e.g., during factory setting), where interconnect delay 165 is measured and a delay value 155 corresponding to the measured interconnect delay 165 is programmed in clock delay circuit 150 (e.g., in a register or other data storage element). In other embodiments, delay value 155 is provided by a user at a time during operation of die 105. Examples of circuitry included in clock delay circuit 150 include, but are not limited to, a variable delay line, a variable frequency oscillator, and the like.

When clock aligning block 120 compares received source clock signal 170 and intermediate adjusted clock signal 190, clock aligning block 120 is configured to output a master adjusted clock signal 175 that is adjusted to compensate for delay exhibited by intermediate adjusted clock signal 190. It is noted that received source clock signal 170 is a delayed version of source clock signal 160 due to interconnect delay 165 and intermediate adjusted clock signal 190 is a delayed version of the feedback balanced clock signal 185 with a delay time equal to interconnect delay 165. As a result of phase aligning the delayed versions of source clock signal 160 and feedback balanced clock signal 185 (i.e., by phase aligning received source clock signal 170 and intermediate adjusted clock signal 190), the feedback balanced clock signal 185 and other balanced clock signals 185 distributed by clock distribution network 140 also become phase aligned with the source clock signal 160. Clock aligning block 120 also adjusts master adjusted clock signal 175 to compensate for other delay exhibited by intermediate adjusted clock signal 190, including CCB delay 135 and CDN delay 145.

Once the balanced clock signals 185 distributed by clock distribution network 140 are phase aligned with the source clock signal 160, the aligned clock signals 185 are used to clock on-chip synchronous logic 125 on die 105, while source clock signal 160 is used to clock synchronous logic on the host die. One or more aligned clock signals 185 may each have a different clock frequency, where each clock signal 185 has a frequency that is some factor (e.g., multiple or fraction) of the frequency of master adjusted clock signal 175 or intermediate adjusted clock signal 190. For example, an aligned clock signal 185 provided to on-chip synchronous logic 125 may have a clock frequency divided by two or four, as compared with the clock frequency of intermediate adjusted clock signal 190. In such an example, a similarly divided clock signal may also be provided to synchronous logic on the host die. This results in synchronous communication between on-chip synchronous logic 125 on die 105 and synchronous logic on the host die. In this manner, a solution for aligning clock signals utilizing a static delay value is provided in FIG. 1.

Figure 2:
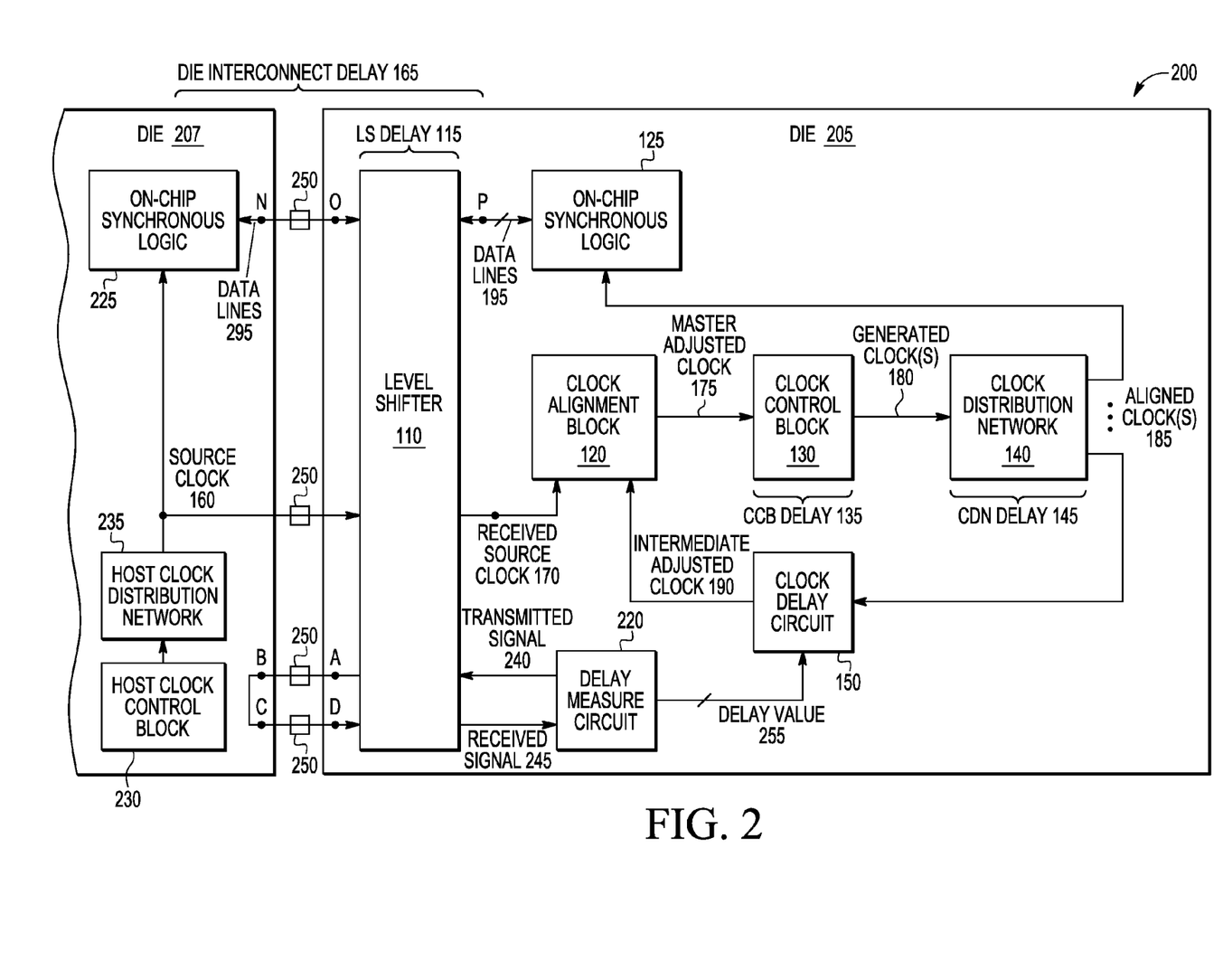

FIG. 2 illustrates a simplified block diagram depicting an example semiconductor device 205 of a system 200 in which the disclosure is implemented. In some embodiments, semiconductor device 205 is a die 205 that is an expansion device included in a system-in-package (SiP) package 200, which also includes host die 207. In other embodiments, semiconductor device 205 and a host semiconductor device 207 are part of a single die, where the semiconductor device 205 and host semiconductor device 207 are intraconnected devices on the single die. While die 205 and 207 include a great variety of components, many components are omitted in FIG. 2 to maintain simplicity.

Die 205 includes a number of components discussed above in connection with FIG. 1, where like reference numbers indicate similar components. For example, die 205 includes level shifter 110, on-chip synchronous logic 125, clock aligning block 120, clock control block 130, clock distribution network 140, and clock delay circuit 150, which operate as similarly discussed above. While the embodiment illustrated in FIG. 2 includes a level shifter on die 205 and not on die 207, it is noted that other embodiments provide for a level shifter on die 207 and not on die 205. It is also noted that some other embodiments provide for a level shifter on both die 205 and on die 207, and still other embodiments provide that a level shifter is not included on either die 205 or on die 207.

Die 207 includes a host clock control block 230 that is configured to receive a master adjusted clock signal (not shown) and to output one or more generated clock signals to host clock distribution network 235. Host clock distribution network 235 is balanced and distributes one or more clock signals, including source clock signal 160, to on-chip synchronous logic 225 of die 207 in such a way that the synchronous elements receive logic level changes of the distributed clock signals simultaneously. On-chip synchronous logic 225 is configured to be in synchronous communication with on-chip synchronous logic 125 via data lines 295, level shifter 110, and data lines 195. Also, bus and address control lines (not shown) are associated with data lines 295 and 195. An example embodiment of on-chip synchronous logic 125 and 225 includes a synchronous bus that is configured to provide synchronous communication between die 205 and host die 207.

Die interconnect delay 165 (or simply interconnect delay 165) is an amount of delay that is introduced to source clock signal 160 as it travels from a point where source clock 160 is available to synchronous elements on host die 207 (e.g., at output of host clock distribution network 235) through interconnect circuitry of host die 207 and interconnect circuitry (including through level shifter 110) of die 205 to a point where received source clock signal 170 is available to clock aligning block 120. In the embodiment illustrated in FIG. 2, interconnect delay 165 is modeled to include LS delay 115 and die-to-die delay 250, represented as delay elements 250 in FIG. 2. Die-to-die delay 250 includes delay time introduced by various interconnect circuitry during transmission of source clock signal 160 from host die 207 to die 205 (excluding LS delay 115). For example, die-to-die delay 250 may include propagation delay of buffers (not shown) utilized to strengthen source clock signal 160 before and after transmission between die 205 and 207, as well as propagation delay of interconnect circuitry not shown in FIG. 2. For simplicity's sake, die-to-die delay 250 is shown as being a same amount of delay in both directions, from die 205 to host die 207 (e.g., a path shown as node A to node B) and from host die 207 to die 205 (e.g., a path shown as node C to node D). In some embodiments, die-to-die delay 250 may be a different amount of delay in different directions.

Die 205 also includes a delay measure circuit 220 that is configured to dynamically measure interconnect delay 165 between host die 207 and die 205 (during operation of die 205) using a loopback path over interconnect circuitry on die 205 that is coupled to interconnect circuitry on host die 207. The loopback path is illustrated as a path traveling from delay measure circuit 220 as transmitted signal 240, traverses level shifter 110, traverses remaining interconnect circuitry from die 205 to host die 207 through nodes A and B, traverses the remaining interconnect circuitry returning from host die 207 to die 205 through nodes C and D, traverses level shifter 110, and is received as received signal 245 at delay measure circuit 220. Following loopback path, node A is located immediately before transmit interconnect circuitry of die 205, node B is located immediately after receipt interconnect circuitry of host die 207, node C is located immediately before transmit interconnect circuitry of host die 207, and node D is located immediately after receipt interconnect circuitry of die 205.

Delay measure circuit 220 is configured to output a transmitted signal 240 (or a measurement signal) through level shifter 110 to host die 207 via the first half of the loopback path. Host die 207 receives and returns the signal to die 205 via the second half of the loopback path through level shifter 110, where delay measure circuit 220 receives the returned signal as received signal 245 (or a delayed measurement signal). As illustrated in FIG. 2, the transmitted signal 240 experiences delay arising from traversing transmit interconnect circuitry on die 205 and receipt interconnect circuitry on host die 207, which is represented as a die-to-die delay element 250 between nodes A and B. The transmitted signal 240 also experiences delay arising from traversing transmit interconnect circuitry on host die 207 and receipt interconnect circuitry on die 205, which is also represented as a die-to-die delay element 250 between nodes C and D. Since the loopback path travels to die 207 and back to die 205, the loopback path replicates twice the delay experienced by source clock signal 160 as it travels from die 207 to die 205. As noted above, die-to-die delay 250 is the same amount of delay in both directions in the embodiments discussed herein. Delay measure circuit 220 is configured to measure the round-trip delay introduced into the transmitted signal 240 while traveling through level shifter 110 (which is LS delay 115), along the first half of the loopback path through interconnect circuitry of die 205 and 207 (which is die-to-die delay 250), along the second half of the loopback path through interconnect circuitry of die 205 and 207 (which is also die-to-die delay 250), and through level shifter 110 (which is LS delay 115).

It is noted that data signals also experience delay from similarly traversing interconnect circuitry on host die 207 and die 205, which is also represented as a die-to-die delay element 250 between nodes N and O, which are on opposing sides of the coupled interconnect circuitry of die 207 and 205 (e.g., node N is similar in position to nodes B and C, while node O is similar in position to nodes A and D).

Delay measure circuit 220 is configured to measure the round-trip delay by comparing phases of the transmitted signal 240 (measurement signal) and the received signal 245 (delayed measurement signal) to determine the phase difference between the transmitted signal 240 and the received signal 245. The phase difference indicates the total round-trip delay. Delay measure circuit 220 is configured to divide the total round-trip delay by two to determine the (one-way) interconnect delay 165 between host die 207 and die 205. Delay measure circuit 220 then outputs a delay value 255 to clock delay circuit 150, where delay value 255 corresponds to the interconnect delay 165. In some embodiments, delay value 255 is a delay control signal (e.g., a voltage signal that is proportional to interconnect delay 165) utilized by clock delay circuit 150 to control a delay element (e.g., a variable delay line or a variable frequency oscillator) to introduce a delay time into feedback balanced clock signal 185, where the delay time is equal to interconnect delay 165. In other embodiments, delay value 255 is a delay code or other numerical value that represents the delay time equal to interconnect delay 165. Clock delay circuit 150 is configured to determine a delay control signal corresponding to delay value 255, where the delay control signal is utilized to control a delay element that introduces the delay time (equal to interconnect delay 165) into feedback balanced clock signal 185. Since interconnect delay 165 is determined dynamically, delay value 255 is provided dynamically to clock delay circuit 150. Examples of circuitry included in delay measure circuit 220 include, but are not limited to, a phase detector, and the like.

As similarly discussed above, clock delay circuit 150 is configured to output a delayed version of the feedback balanced clock signal 185, according to delay value 255, as intermediate adjusted clock signal 190, which is provided to clock aligning block 120 as the feedback clock signal. When clock aligning block 120 compares received source clock signal 170 and intermediate adjusted clock signal 190, clock aligning block 120 is configured to output a master adjusted clock signal 175 that is adjusted to compensate for delay exhibited by intermediate adjusted clock signal 190. It is again noted that received source clock signal 170 is a delayed version of source clock signal 160 due to interconnect delay 165 and intermediate adjusted clock signal 190 is a delayed version of the feedback balanced clock signal 185 with a delay time equal to interconnect delay 165. As a result of phase aligning the delayed versions of source clock signal 160 and balanced clock signal 185 (i.e., by phase aligning received source clock signal 170 and intermediate adjusted clock signal 190), the feedback balanced clock signal 185 (and other balanced clock signals 185 distributed by clock distribution network 140) also become phase aligned with the source clock signal 160. Clock aligning block 120 also adjusts master adjusted clock signal 175 to compensate for other delay exhibited by intermediate adjusted clock signal 190, including CCB delay 135 and CDN delay 145.

Once the balanced clock signals 185 distributed by clock distribution network 140 are phase aligned with the source clock signal 160, the aligned clock signals 185 are used to clock on-chip synchronous logic 125 on die 205, while source clock signal 160 is used to clock synchronous logic 225 on host die 207. This results in synchronous communication between on-chip synchronous logic 125 on die 205 and synchronous logic 225 on host die 207. In this manner, a solution for aligning clock signals utilizing dynamic delay measurement is provided in FIG. 2.

Figure 3:
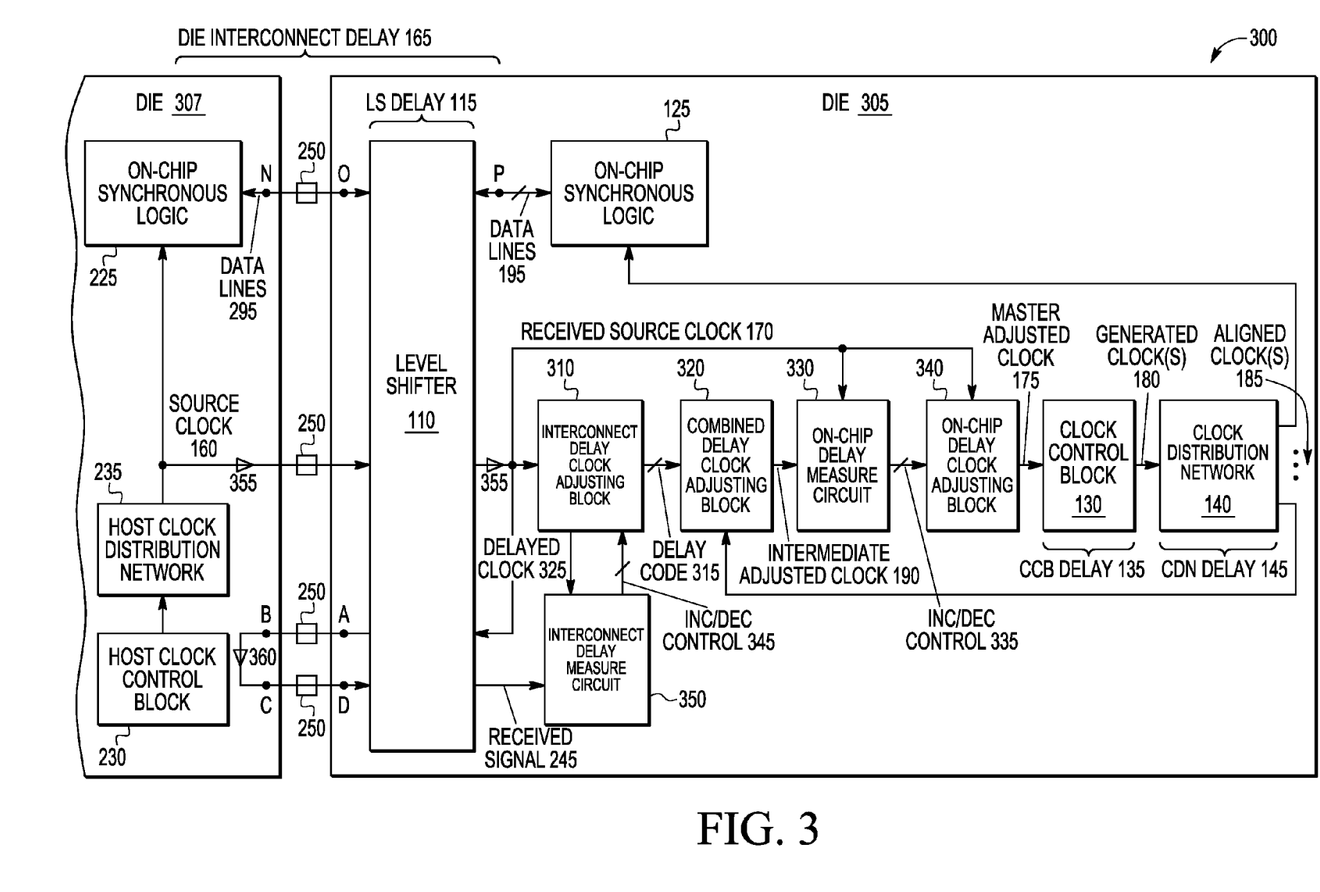

FIG. 3 illustrates a simplified block diagram depicting an example semiconductor device 305 of system 300 in which the disclosure is implemented. In some embodiments, semiconductor device 305 is a die 305 that is included in a system-in-package (SiP) package 300, which also includes host die 307. In other embodiments, semiconductor device 305 and a host semiconductor device 307 are part of a single die, where the semiconductor device 305 and the host semiconductor device 307 are intraconnected devices on the single die. While die 305 and 307 include a great variety of components, many components are omitted in FIG. 3 to maintain simplicity.

Die 305 includes a number of components discussed above in connection with FIGS. 1 and 2, where like reference numbers indicate similar components. For example, die 305 includes level shifter 110, on-chip synchronous logic 125, clock control block 130, and clock distribution network 140, which operate as similarly discussed above. Host die 307 includes a number of components discussed above in connection with FIG. 2, where like reference numbers also indicate similar components. For example, die 307 includes host clock control block 230, host clock distribution network 235, and on-chip synchronous logic 225, which operate as similarly discussed above. Host die 307 and die 305 are configured to be in die-to-die communication via data lines 195, level shifter 110, and data lines 295, as similarly discussed above. While the embodiment illustrated in FIG. 3 includes a level shifter on die 305 and not on die 307, it is noted that other embodiments provide for a level shifter on die 307 and not on die 305. It is also noted that some other embodiments provide for a level shifter on both die 305 and on die 307, and still other embodiments provide that a level shifter is not included on either die 305 or on die 307.

Die 305 includes a clock alignment loop circuit, which in turn includes an interconnect delay clock adjusting block 310, a combined delay clock adjusting block 320, an on-chip delay measure circuit 330, an on-chip delay clock adjusting block 340, a clock control block 130, a clock distribution network 140, and an interconnect delay measure circuit 350. The clock alignment loop circuit includes a generated clock signal path from interconnect delay clock adjusting block 310 (in combination with interconnect delay measure circuit 350) to clock distribution network 140, and a feedback signal path from clock distribution network 140 to combined delay clock adjusting block 320. The clock alignment loop circuit is configured to align one or more local clock signals with source clock signal 160 to achieve a single clock domain between die 307 and die 305.

Interconnect delay clock adjusting block 310 and interconnect delay measure circuit 350 are configured to dynamically determine interconnect delay 165 using a loopback path during operation of die 305. The loopback path is illustrated as a path that traverses through level shifter 110 as received source clock signal 170 is transmitted to die 307, traverses remaining interconnect circuitry from die 305 to die 307 through nodes A and B, traverses the remaining interconnect circuitry returning from host die 307 to die 305 through nodes C and D, traverses level shifter 110, and is received as received signal 245 at interconnect delay measure circuit 350. Following loopback path, node A is located immediately before transmit interconnect circuitry of die 305, node B is located immediately after receipt interconnect circuitry of host die 307, node C is located immediately before transmit interconnect circuitry of host die 307, and node D is located immediately after receipt interconnect circuitry of die 305. A transmitted signal (or measurement signal), such as the transmitted version of received source clock signal 170 in FIG. 3, experiences delay arising from traversing interconnect circuitry on die 305 and interconnect circuitry on die 307, which is represented by die-to-die delay element 250 between nodes A and B and between nodes C and D, as similarly discussed above. As noted above, die-to-die delay 250 is the same amount of delay in both directions in the embodiments discussed herein.

The transmitted signal also experiences delay arising from traversing one or more buffer elements 355 on die 305 and host die 307, where the buffer elements 355 are utilized to strengthen the source clock signal 160 and received source clock signal 170. Each buffer 355 also includes logic gate elements and introduces additional propagation delay. In the embodiment illustrated in FIG. 3, interconnect delay 165 is modeled to include LS delay 115, die-to-die delay 250 (excluding buffer delay 355 and LS delay 115), and buffer delay 355 on both die 307 and die 305. Although not shown, similar buffers 355 may also be implemented to strengthen data lines 295 on die 307 before transmission to die 305 and strengthen data lines 195 after being output by level shifter 110, in some embodiments.

In order for the loopback path to accurately replicate the delay experienced by source clock signal 160 transmitted from host die 307 to die 305, a buffer delay 360 is implemented on die 307 as part of the loopback path. Buffer delay 360 is configured to introduce a delay time equivalent to twice the total buffer delay time introduced by both buffers 355 on die 307 and on die 305. For example, buffer delay 360 may represent four buffers 355 connected end to end on die 307 to introduce an equivalent buffer delay in the loopback path in order to accurately represent the total delay experienced by source clock signal 160 traveling round-trip from die 305 to die 307 and back to die 305. By accurately replicating twice the delay experienced by source clock signal 160, an accurate round-trip delay can be measured, which when halved yields an accurate interconnect delay 165 (which is half of the round-trip delay).

The loopback path replicates twice the delay experienced by source clock signal 160 as it travels from host die 307 to die 305. Interconnect delay measure circuit 350 is configured to measure the total round-trip delay introduced into received source clock signal 170 while traveling along the loopback path. The total round-trip delay includes delay through level shifter 110 (which is LS delay 115), along the first half of the loopback path through interconnect circuitry of die 305 and 307 (which is die-to-die delay 250), through buffer delay 360, along the second half of the loopback path through interconnect circuitry of die 305 and 307 (which is also die-to-die delay 250), and through level shifter 110 (which is also LS delay 115).

Interconnect delay measure circuit 350 has two inputs, the received signal 245 (or the delayed measurement signal) and a delayed clock signal 325 from interconnect delay clock adjusting block 310. Interconnect delay measure circuit 350 is configured to measure the round-trip delay by comparing phases of received signal 245 and the delayed clock signal 325 to determine the phase difference between the received signal 245 and the delayed clock signal 325. The phase difference indicates the round-trip delay. Based on the phase difference, interconnect delay measure circuit 350 is configured to output an increase/decrease (inc/dec) control signal 345, which is provided to interconnect delay clock adjusting block 310. Inc/dec control signal 345 indicates to interconnect delay clock adjusting block 310 whether the phase of the delayed clock signal 325 should be delayed by a greater or lesser amount of delay in order to phase align the delayed clock 325 with the received signal 245. For example, if a positive clock edge of delayed clock signal 325 is received before a positive clock edge of received signal 245, inc/dec control signal 345 indicates that the phase of delayed clock signal 325 should be delayed by a greater amount of delay in order to phase align with received signal 245 (e.g., control signal 345 indicates "increase" to clock adjusting block 310). Similarly, if a positive clock edge of delayed clock signal 325 is received after a positive clock edge of received signal 245, inc/dec control signal 345 indicates that the phase of delayed clock signal 325 should be delayed by a smaller amount of delay in order to phase align with received signal 245 (e.g., control signal 345 indicates "decrease" to clock adjusting block 310). Examples of circuitry included in interconnect measure circuit 350 include, but are not limited to, a phase detector, and the like.

Interconnect delay clock adjusting block 310 has two inputs, the received source clock signal 170 and the increase/decrease control signal 345 from interconnect delay measure circuit 350. Interconnect delay clock adjusting block 310 is configured to output a delayed version of receive source clock 170 (which is delayed or adjusted according to inc/dec control signal 345, as described above) as the delayed clock signal 325 to interconnect delay measure circuit 350. Interconnect delay clock adjusting block 310 also includes tracking circuitry to determine the round-trip delay by accumulating the amount of delay introduced to received source clock signal 170 (which results in delayed clock signal 325) based on the on-going indications of inc/dec control signal 345. In other words, the phase difference between received source clock 170 and delayed clock signal 325 (once delayed clock signal 325 is phase aligned or locked with received signal 245) indicates the round-trip delay, where the phase difference is introduced by interconnect delay measure circuit 350 (e.g., incrementally or otherwise). Interconnect delay clock adjusting block 310 is configured to divide the round-trip delay by two to determine the (one-way) interconnect delay 165 from host die 307 to die 305. Interconnect delay clock adjusting block 310 then outputs a delay code 315 to combined delay clock adjusting block 320, where delay code 315 represents the delay time equal to interconnect delay 165. In some embodiments, delay code 315 is also stored at interconnect delay clock adjusting block 310. Since interconnect delay 165 is determined dynamically (and may change due to variations in voltage supply, temperature, electromagnetic interference, and the like), delay code 315 is also determined dynamically and provided to combined delay clock adjusting block 320. Examples of circuitry included in interconnect delay clock adjusting block 310 include, but are not limited to, a variable delay line, a variable frequency oscillator, and similar circuitry that is configured to output an adjustable periodic clock signal utilized for delay measurement, as well as output a delay code reflecting the delay measurement.

Combined delay clock adjusting block 320 has two inputs, a feedback balanced clock 185 and the delay code 315. Combined delay clock adjusting block 320 includes a delay element and circuitry configured to utilize delay code 315 to set or control the delay element to introduce the delay time (equal to interconnect delay 165) into feedback balanced clock 185, which is output as intermediate adjusted clock 190 to on-chip delay measure circuit 330. In other embodiments (not shown), delay code 315 is a delay control signal (e.g., a voltage signal that is proportional to interconnect delay 165) utilized by combined delay clock adjusting block 320 to control the delay element (e.g., a variable delay line or a variable frequency oscillator) to introduce a delay time (equal to interconnect delay 165) into feedback balanced clock signal 185. Examples of circuitry included in combined delay clock adjusting block 320 include but are not limited to a variable delay line, a variable frequency oscillator, and similar circuitry that is configured to output an adjustable periodic clock signal.

On-chip delay measure circuit 330 has two inputs, intermediate adjusted clock 190 and received source clock 170. On-chip delay measure circuit 330 is configured to measure on-chip delay by comparing phases of intermediate adjusted clock signal 190 and received source clock signal 170 to determine the phase difference between the phases. The phase difference indicates the on-chip delay, which includes CCB delay 135 and CDN delay 145. Based on the phase difference, on-chip delay measure circuit 330 is configured to output an increase/decrease (inc/dec) control signal 335, which is provided to on-chip delay clock adjusting block 340. Inc/dec control signal 335 indicates to on-chip delay clock adjusting block 340 whether the phase of intermediate adjusted clock 190 should be delayed by a greater or lesser amount of delay in order to phase align intermediate adjusted clock 190 with received source clock signal 170, as similarly discussed above in connection with inc/dec control signal 345 of interconnect delay measure circuit 350. Examples of circuitry included in on-chip delay measure circuit 330 include, but are not limited to, a phase detector, and the like.

On-chip delay clock adjusting block 340 has two inputs, received source clock signal 170 and the increase/decrease control signal 335 from on-chip delay measure circuit 330. On-chip delay clock adjusting block 340 is configured to output a delayed version of received source clock 170 (which is delayed or adjusted according to inc/dec control signal 335, as described above) as the master adjusted clock signal 175 to clock control block 130. The phase of master adjusted clock signal 175 compensates for on-chip delay (including CCB delay 135 and CDN delay 145) exhibited by intermediate adjusted clock 190, as compared with received source clock 170 by on-chip delay measure circuit 330. The phase of master adjusted clock signal 175 also compensates for interconnect delay 165 (including die-to-die delay 250, LS delay 115, and delay arising from one or more buffers 355). Master adjusted clock 175 is provided to clock control block 130, as similarly discussed above.

It is again noted that received source clock signal 170 is a delayed version of source clock signal 160 due to interconnect delay 165. The intermediate adjusted clock signal 190 is a delayed version of the feedback balanced clock signal 185 by a delay time equal to interconnect delay 165. As a result of phase aligning the delayed versions of source clock signal 160 and balanced clock signal 185 (i.e., by phase aligning received source clock signal 170 and intermediate adjusted clock signal 190), the feedback balanced clock signal 185 (and other balanced clock signals 185 distributed by clock distribution network 140) also become phase aligned with the source clock signal 160.

Once the balanced clock signals 185 distributed by clock distribution network 140 are phase aligned with the source clock signal 160, the aligned clock signals 185 are used to clock on-chip synchronous logic 125 on die 305, while source clock signal 160 is used to clock synchronous logic 225 on the host die 307. This results in synchronous communication between on-chip synchronous logic 125 on die 305 and synchronous logic 225 on the host die 307. In this manner, a solution for aligning clock signals utilizing dynamic delay measurement is provided in FIG. 3.

Figure 4:
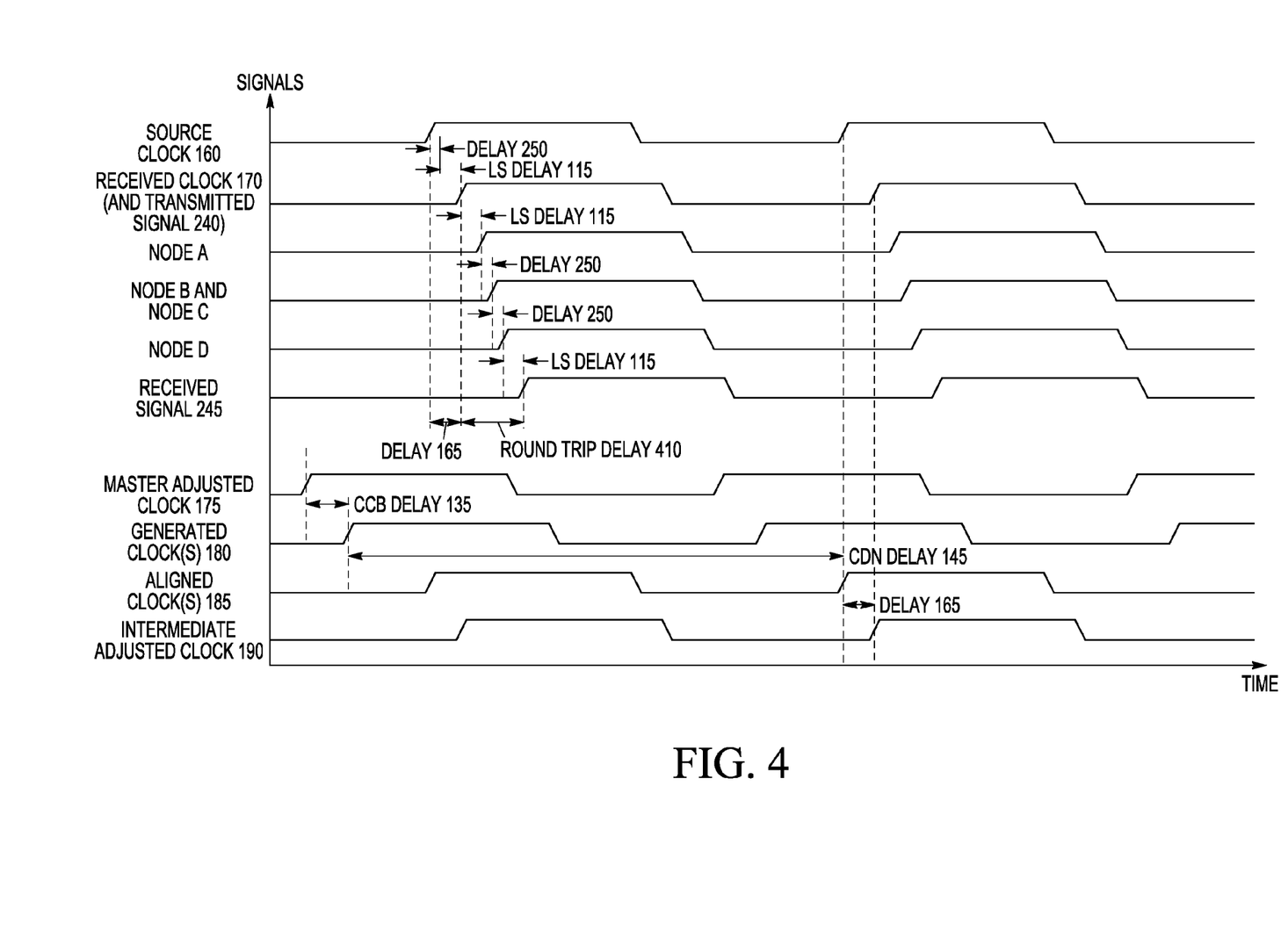
FIG. 4 illustrates waveforms of example clock signals present at a plurality of nodes of a semiconductor device in which the disclosure is implemented, according to some embodiments.

FIG. 4 illustrates waveforms of example clock signals present at a plurality of nodes of a semiconductor device in which the present disclosure is implemented. The waveforms illustrate the introduction of delay into source clock signal 160 and the compensation of such delay to achieve aligned clocks 185 that are phase aligned with the source clock signal 160. While the waveforms illustrated in FIG. 4 are explained herein using the embodiment of the present disclosure illustrated in FIG. 2 involving die 205 and host die 207, similar waveforms exist for other embodiments, as will be noted below. The illustrated waveforms are present after phase alignment of source clock signal 160 and balanced clock signals 185 (which are also referred to as aligned clock signals 185).

Source clock signal 160 is illustrated at the top of FIG. 4, with received clock signal 170 illustrated immediately below. It is noted that a phase difference exists between source clock signal 160 and received clock signal 170, as illustrated by the positive edge of received clock signal 170 following the positive edge of source clock signal 160 by die-to-die delay 250 and level shifter (LS) delay 115. The sum of this delay is interconnect delay 165, and in some embodiments (such as the embodiment discussed in connection with FIG. 1) is measured directly at a time prior to device operation (e.g., during a factory setting period of time prior to runtime operation) and a representation of such interconnect delay 165 is programmed as delay value 155 into clock delay circuit 150, as discussed above. In such an embodiment, interconnect delay 165 is introduced into aligned clocks 185 prior to clock alignment block 120, which phase aligns received clock signal 170 and intermediate adjusted clock 190. Since both source clock 160 and aligned clocks 185 are delayed by the same amount of interconnect delay 165, source clock signal 160 and aligned clocks 185 are also phase aligned.

In order to measure interconnect delay 165 in some embodiments (such as the embodiments discussed in connection with FIGS. 2 and 3), a signal is transmitted on a loopback path that includes nodes A, B, C, and D in order to determine a round trip delay 410, as discussed above. For simplicity's sake, transmitted signal 240 is illustrated as the same waveform of received clock signal 170, although transmitted signal 240 may actually be another waveform that has some phase difference from received clock signal 170. For example, in the embodiment of FIG. 3, received clock signal 170 is transmitted to host die 307 and is equivalent to transmitted signal 240 (not labeled in FIG. 3), where transmitted signal 240 has the same waveform as received clock signal 170. By contrast, the transmitted signal 240 in the embodiment of FIG. 2 is independent from received clock signal 170, where transmitted signal 240 has a different waveform than received clock signal 170 (and would thus likely have some phase difference from received clock signal 170).

Regardless of the presence of any relationship between received clock signal 170 and transmitted signal 240, it is noted that a phase difference exists between the waveforms of transmitted signal 240 and node A signal, as illustrated by the positive edge of node A signal following the positive edge of transmitted signal 240 by LS delay 115. LS delay 115 arises as the transmitted signal 240 traverses LS shifter 110 to node A. Similarly, a phase difference exists between the waveforms of nodes A and B, as illustrated by the positive edge of node B signal following the positive edge of node A signal by die-to-die delay 250. Die-to-die delay 250 arises as the node A signal traverses the transmit interconnect circuitry of die 205 and the receipt interconnect circuitry of host die 207 to node B.

Since the embodiment of FIG. 2 indicates that the node B signal is immediately returned to die 205, the node C signal is illustrated as the same waveform of node B signal. In the embodiment of FIG. 3, the waveforms of nodes B and C would have a phase difference equal to the buffer delay 360, which would also increase the (overall) interconnect delay 165 and the round-trip delay 410.

It is noted that a phase difference exists between the waveforms of nodes C and D, as illustrated by the positive edge of node D following the positive edge of node C by die-to-die delay 250. Die-to-die delay 250 arises as the node C signal traverses the transmit interconnect circuitry of host die 207 and the receipt interconnect circuitry of die 205 to node D. Similarly, a phase difference exists between the waveforms of node D and received signal 245, as illustrated by the positive edge of received signal 245 following the positive edge of node D by LS delay 115. LS delay 115 arises as the node D signal traverses LS shifter 110 to an input of delay measure circuit 220.

As the transmitted signal traverses the loopback path, delay introduced to the transmitted signal 240 accumulates, resulting in round trip delay 410. In other words, a phase difference equal to the round-trip delay 410 exists between transmitted signal 240 and received signal 245. The round-trip delay 410 is equal to twice the interconnect delay 165. Once the round-trip delay 410 is determined, interconnect delay 165 is determined by dividing round-trip delay 410 by two.

Master adjusted clock 175 is shown with a phase that has been adjusted to compensate for both on-chip delay and interconnect delay 165. As discussed above, clock alignment block 120 is configured to phase align received source clock signal 170 and intermediate adjusted clock 190 by adjusting the delay of master adjusted clock signal 175. As shown in FIG. 4, master adjusted clock 175 experiences CCB delay 135 as it traverses clock control block 130 and is output as one or more generated clock signals 180. The generated clock signals 180 then experience CDN delay 145 as the generated clock signals traverse the clock distribution network 140 and are output as aligned clocks 185. Finally, clock delay circuit 150 introduces delay 165 to aligned clocks 185 immediately before clock alignment block 120, resulting in intermediate adjusted clock 190. Thus, the position of a rising edge of master adjusted clock 175 is adjusted to compensate for the delays that include CCB delay 135, CDN delay 145, and interconnect delay 165 between master adjusted clock 175 and intermediate adjusted clock 190. Further, since intermediate adjusted clock 190 is a delayed version of aligned clocks 185 and received clock signal 170 is a delayed version of source clock signal 160, source clock 160 and aligned clocks 185 are also phase aligned as a result of phase aligning intermediate adjusted clock 190 with received clock signal 170.

Figure 5:
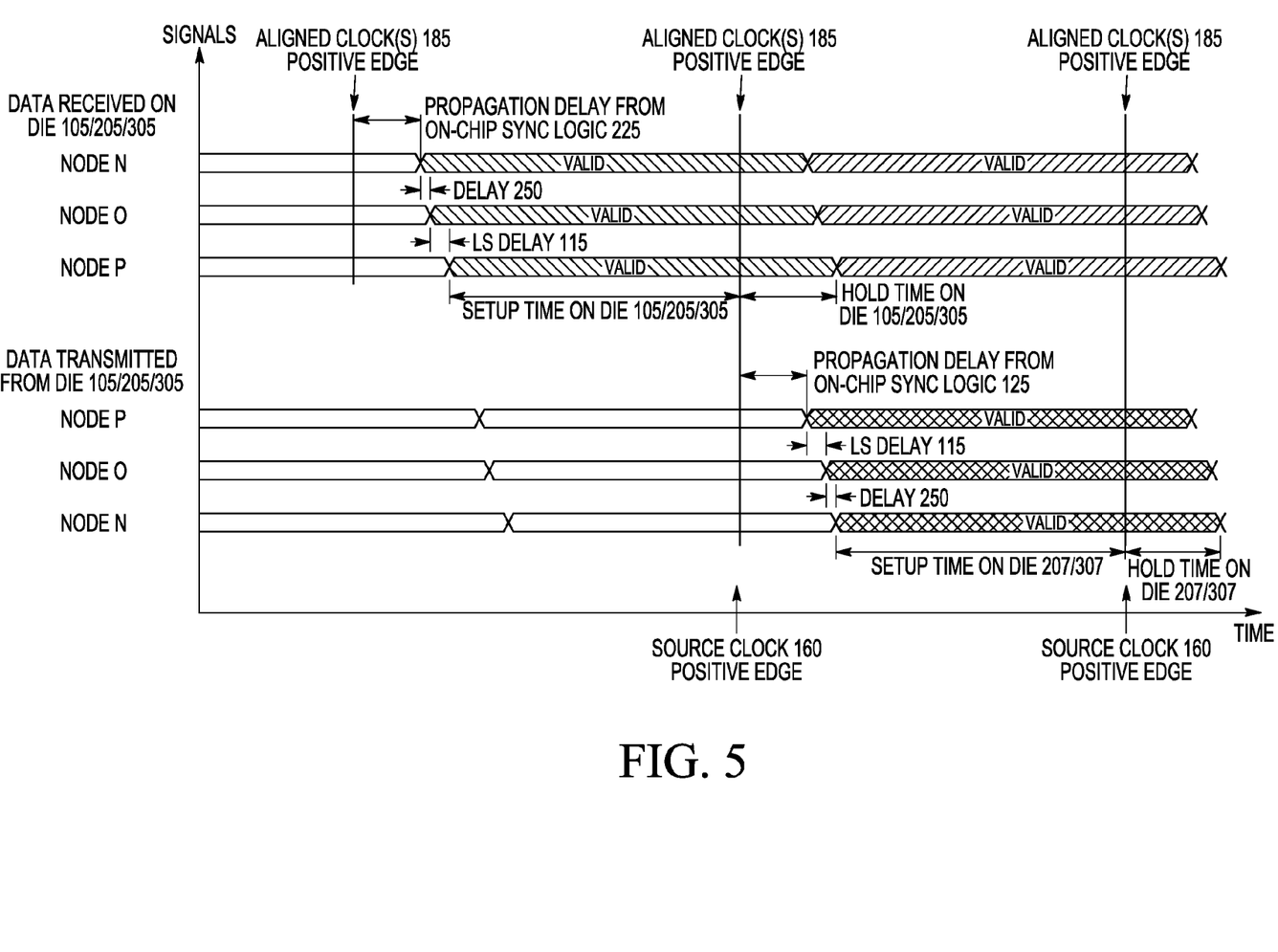
FIG. 5 illustrates waveforms of example data signals present at a plurality of nodes of a semiconductor device in which the disclosure is implemented, according to some embodiments.

FIG. 5 illustrates waveforms of example data signals present at a plurality of nodes of a semiconductor device in which the disclosure is implemented. The waveforms illustrate synchronous communication achieved between two semiconductor devices, or die, within the same clock domain.

Data signals being received by a die, such as by any of the die discussed above in connection with FIGS. 1, 2, and 3, is illustrated on the top half of FIG. 5. Node N data signal that is transmitted from a host die (e.g., die 207 or 307) and received on a secondary die (e.g., die 105, 205, or 305), experiences some propagation delay from on-chip synchronous logic 225 on the host die before being transmitted, as illustrated by the edge of node N valid data following the positive edge of aligned clock 185 (which is phase aligned with source clock signal 160) by some clock-to-output delay of registers in on-chip synchronous logic 225.

Node O data signal experiences die-to-die delay 250 as the data signal traverses transmit interconnect circuitry of the host die and the receipt interconnect circuitry of the secondary die, as illustrated by the edge of node O valid data following the edge of node N valid data by die-to-die delay 250.

Node P data signal experiences LS delay 115 as the data signal traverses LS shifter 110 to node P, as illustrated by the edge of node P valid data following the edge of node O valid data by LS delay 115. The edge of valid data of node P signal occurs at a time before the next positive edge of aligned clock 185 to satisfy setup time requirements of elements within on-chip synchronous logic 125 of the secondary die. The valid data of node P signal also remains stable for a time after the positive edge of aligned clock 185 to satisfy hold time requirements of elements within on-chip synchronous logic 125 of the secondary die.

Data signals being transmitted by a die, such as from any of the die discussed above in connection with FIGS. 1, 2, and 3, is illustrated on the bottom half of FIG. 5. Node P data signal that is transmitted from the secondary die (e.g., die 105, 205, or 305) and received on the host die (e.g., die 207 or 307), experiences some propagation delay from on-chip synchronous logic 125 on the secondary die before being transmitted, as illustrated by the edge of node P valid data following the positive edge of aligned clock 185 (which is phase aligned with source clock signal 160 on die 207 or 307) by some clock-to-output delay from a register in on-chip synchronous logic 225

Node O data signal experiences LS delay 115 as the data signal traverses LS shifter 110, as illustrated by the edge of node O valid data following the edge of node P valid data by LS delay 115. Node N data signal experiences die-to-die delay 250 as the data signal traverses transmit interconnect circuitry of the secondary die and receipt interconnect circuitry of the host die, as illustrated by the edge of node N valid data following the edge of node O valid data by die-to-die delay 250. The edge of valid data of node N occurs at a time before the next positive edge of source clock 160 to satisfy setup time requirements of element within on-chip synchronous logic 225 of the host die. The valid data of node N signal also remains stable for a time after the positive edge of source clock 160 to satisfy hold time requirements of elements within on-chip synchronous logic 225 of the host die.

By now it should be appreciated that there have been provided embodiments for adaptive clock signal alignment, which compensates for interconnect delay between semiconductor devices and automatically adjusts a local clock signal to be aligned with a source clock signal of a host device. In one embodiment of the present disclosure, a semiconductor device is provided that includes a clock delay circuit configured to receive a delay value associated with an interconnect delay, where the interconnect delay is measured across interconnect circuitry that communicatively couples a host semiconductor device with the semiconductor device. The clock delay circuit is also configured to delay a local clock signal by an amount of delay indicated by the delay value, where the local clock signal is generated on the semiconductor device. The semiconductor device also includes a clock alignment block configured to receive a delayed local clock signal from the clock delay circuit, receive a delayed source clock signal, where the delayed source clock signal is received from the host semiconductor device via the interconnect circuitry, and output a master clock signal based on a comparison of the delayed source clock signal and the delayed local clock signal, where the master clock signal is utilized to generate one or more aligned clock signals on the semiconductor device that are aligned with a source clock signal generated on the host semiconductor device.

One aspect of the above embodiment provides that the semiconductor device further includes synchronous logic configured to utilize one of the one or more aligned clock signals as a local source clock signal, where the synchronous logic is configured for synchronous communication with host synchronous logic in the host semiconductor device, and the host synchronous logic is configured to utilize the source clock signal.

Another aspect of the above embodiment provides that the semiconductor device further includes a clock control block configured to utilize the master clock signal to output one or more generated clock signals, where the one or more generated clock signals include a first local delay introduced by the clock control block.

A further aspect of the above embodiment provides that the semiconductor device further includes a clock distribution network configured to distribute the one or more generated clock signals as one or more aligned clock signals to synchronous elements on the semiconductor device, where the one or more generated clock signals include a second local delay introduced by the clock distribution network, where the clock alignment block is further configured to adjust the master clock signal to compensate for the first local delay and the second local delay.

Another aspect of the above embodiment provides that the semiconductor device includes a first semiconductor die, the host semiconductor device includes a second semiconductor die, and the first semiconductor die and the second semiconductor die are included in a package.

Another aspect of the above embodiment provides that the delay value includes one of a factory-stored nonvolatile value and a user-provided nonvolatile value.

Another aspect of the above embodiment provides that the semiconductor device further includes a delay measure circuit configured to measure the interconnect delay, where the delay measure circuit is further configured to transmit a measurement signal to the host semiconductor device via the interconnect circuitry, receive a delayed measurement signal from the host semiconductor device via the interconnect circuitry, compare the measurement signal and the delayed measurement signal to determine a round-trip delay, calculate the interconnect delay from the round-trip delay, and output the delay value that indicates the interconnect delay to the clock delay circuit.

A further aspect of the above embodiment provides that the delay measure circuit is configured to transmit the measurement signal on a loopback path that includes a first path from an output of the delay measure circuit to the host semiconductor device that traverses the interconnect circuitry and a second path from the host semiconductor device to an input of the delay measure circuit that traverses the interconnect circuitry, and the delay measure circuit is configured to receive the delayed measurement signal from the second path.

Another further aspect of the above embodiment provides that the interconnect circuitry includes a first set of transmit circuitry on the semiconductor device and a first set of receive circuitry on the host semiconductor device, the interconnect circuitry includes a second set of transmit circuitry on the host semiconductor device and a second set of receive circuitry on the host semiconductor device, the first path of the loopback path traverses the first sets of transmit and receive circuitry, the first path is associated with a die-to-die delay, the second path of the loopback path traverses the second sets of transmit and receive circuitry, and the second path is associated with the die-to-die delay.

Another further aspect of the above embodiment provides that the interconnect circuitry includes a level shifter, the interconnect delay includes a delay associated with the level shifter, and the first path and the second path of the loopback path each traverse the level shifter.

Another further aspect of the above embodiment provides that the interconnect circuitry includes a first set of buffer elements associated with a first overall buffer delay, the loopback path traverses a second set of buffer elements associated with a second overall buffer delay, and the second overall buffer delay includes twice the first overall buffer delay.

In another embodiment of the present disclosure, a method is provided that includes receiving a delay value associated with an interconnect delay, where the interconnect delay is measured across interconnect circuitry that communicatively couples a host semiconductor device with a semiconductor device. The method also includes delaying a local clock signal by an amount of delay indicated by the delay value to produce a delayed local clock signal, where the local clock signal is generated on the semiconductor device; receiving a delayed source clock signal, where the delayed source clock signal is received from the host semiconductor device via the interconnect circuitry; and outputting a master clock signal based on a comparison of the delayed source clock signal and the delayed local clock signal, where the master clock signal is utilized to generate one or more aligned clock signals on the semiconductor device that are aligned with a source clock signal generated on the host semiconductor device.

One aspect of the above embodiment provides that the method further includes clocking synchronous logic with one of the one or more aligned clock signals, where the synchronous logic is configured for synchronous communication with host synchronous logic in the host semiconductor device, and the host synchronous logic is configured to utilize the source clock signal.

Another aspect of the above embodiment provides that the method further includes generating one or more generated clock signals based on the master clock signal, where the one or more generated clock signals include a first local delay introduced by the generating.

A further aspect of the above embodiment provides that the method further includes distributing the one or more generated clock signals as one or more aligned clock signals to synchronous elements on the semiconductor device, where the one or more aligned clock signals include a second local delay introduced by the distributing; and adjusting the master clock signal to compensate for the first local delay and the second local delay.

Another aspect of the above embodiment provides that the method further includes measuring the interconnect delay, the measuring includes transmitting a measurement signal to the host semiconductor device via the interconnect circuitry, receiving a delayed measurement signal from the host semiconductor device via the interconnect circuitry, comparing the measurement signal and the delayed measurement signal to determine a round-trip delay, calculating the interconnect delay from the round-trip delay, and outputting the delay value that indicates the interconnect delay to the clock delay circuit.

A further aspect of the above embodiment provides that the measurement signal is transmitted on a loopback path that includes a first path from the semiconductor device to the host semiconductor device that traverses the interconnect circuitry and a second path from the host semiconductor device to the semiconductor device that traverses the interconnect circuitry, and the delayed measurement signal is received from the second path of the loopback path.

Another further aspect of the above embodiment provides that the interconnect circuitry includes a first set of transmit circuitry on the semiconductor device and a first set of receive circuitry on the host semiconductor device, the interconnect circuitry includes a second set of transmit circuitry on the host semiconductor device and a second set of receive circuitry on the host semiconductor device, the first path of the loopback path traverses the first sets of transmit and receive circuitry, the first path is associated with a die-to-die delay, the second path of the loopback path traverses the second sets of transmit and receive circuitry, and the second path is associated with the die-to-die delay.

Another further aspect of the above embodiment provides that the interconnect circuitry includes a level shifter, the interconnect delay includes a delay associated with the level shifter, and the first path and the second path of the loopback path each traverse the level shifter.

Another further aspect of the above embodiment provides that the interconnect circuitry includes a first set of buffer elements associated with a first overall buffer delay, the loopback path traverses a second set of buffer elements associated with a second overall buffer delay, and the second overall buffer delay includes twice the first overall buffer delay.

In another embodiment of the present disclosure, a semiconductor device is provided that includes a delay measure circuit configured to determine a round-trip delay based on a comparison of a measurement signal and a delayed measurement signal. Interconnect circuitry communicatively couples a host semiconductor device and the semiconductor device, the measurement signal is transmitted to the host semiconductor device via the interconnect circuitry, and the delayed measurement signal is received from the host semiconductor device via the interconnect circuitry. The delay measure circuit is also configured to calculate an interconnect delay of the interconnect circuitry based on the round-trip delay. The semiconductor device also includes a clock alignment loop circuit configured to generate a local source clock signal on the semiconductor device, delay the local source clock signal by the interconnect delay to generate a delayed local source clock signal, and receive a delayed host source clock signal, where the delayed host source clock signal is received from the host semiconductor device via the interconnect circuitry. The clock alignment loop circuit is also configured to generate a master clock signal based on a comparison of the delayed local source clock signal and the delayed host source clock signal, where the master clock signal is utilized to generate an aligned local source clock signal that is aligned with a host source clock signal generated on the host semiconductor device.

In another embodiment of the present disclosure, a semiconductor device is provided that includes an interconnect delay clock adjusting block configured to receive a delayed host source clock signal, where interconnect circuitry communicatively couples a host semiconductor device and the semiconductor device, and the delayed host source clock signal is received from the host semiconductor device via the interconnect circuitry. The interconnect delay clock adjusting block is also configured to output an intermediate clock signal based on the delayed host source clock signal. The semiconductor device also includes an interconnect delay measure circuit configured to output a first control signal based on the intermediate clock signal and a comparison of a delayed measurement signal, where the delayed host source clock signal is immediately transmitted to the host semiconductor device via the interconnect circuitry as a measurement signal, the delayed measurement signal is received from the host semiconductor device via the interconnect circuitry. The interconnect delay clock adjusting block is further configured to delay the intermediate clock signal based on the first control signal, and track an amount of delay introduced into the intermediate clock signal. The interconnect delay measure circuit is further configured to determine a delay code based on the amount of delay, where the delay code corresponds to an interconnect delay of the interconnect circuitry. The semiconductor device also includes a combined delay clock adjusting block configured to adjust a local source clock signal based on the delay code to generate a delayed local source clock signal; and an on-chip delay measure circuit configured to output a second control signal based on a comparison of the delayed host source clock signal and the delayed local source clock signal. The semiconductor device also includes an on-chip delay clock adjusting block configured to adjust the delayed host source clock signal based on the second control signal to output a master clock signal, where the master clock signal is utilized to generate an aligned local source clock signal that is aligned with a host source clock signal generated on the host semiconductor device.

The circuitry described herein may be implemented on a semiconductor substrate, which can be any semiconductor material or combinations of materials, such as gallium arsenide, silicon germanium, silicon-on-insulator (SOI), silicon, monocrystalline silicon, the like, and combinations of the above.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A semiconductor device comprising:
   a clock delay circuit configured to
      receive a delay value associated with an interconnect delay, wherein
         the interconnect delay is measured across interconnect circuitry that communicatively couples a host semiconductor device with the semiconductor device, and
      delay a local clock signal by an amount of delay indicated by the delay value, wherein
         the local clock signal is generated on the semiconductor device; and
   a clock alignment block configured to
      receive a delayed local clock signal from the clock delay circuit,
      receive a delayed source clock signal, wherein
         the delayed source clock signal is received from the host semiconductor device via the interconnect circuitry, and
      output a master clock signal based on a comparison of the delayed source clock signal and the delayed local clock signal, wherein
         the master clock signal is utilized to generate one or more aligned clock signals on the semiconductor device that are aligned with a source clock signal generated on the host semiconductor device.

2. The semiconductor device of claim 1, further comprising:
   synchronous logic configured to utilize one of the one or more aligned clock signals as a local source clock signal, wherein
      the synchronous logic is configured for synchronous communication with host synchronous logic on the host semiconductor device, and
      the host synchronous logic is configured to utilize the source clock signal.

3. The semiconductor device of claim 1, further comprising:
- a clock control block configured to utilize the master clock signal to output one or more generated clock signals, wherein
  - the one or more generated clock signals include a first local delay introduced by the clock control block.

4. The semiconductor device of claim 3, further comprising:
- a clock distribution network configured to distribute the one or more generated clock signals as one or more aligned clock signals to synchronous elements on the semiconductor device, wherein
  - the one or more generated clock signals include a second local delay introduced by the clock distribution network; and
- wherein the clock alignment block is further configured to adjust the master clock signal to compensate for the first local delay and the second local delay.

5. The semiconductor device of claim 1, wherein
- the semiconductor device comprises a first semiconductor die,
- the host semiconductor device comprises a second semiconductor die, and
- the first semiconductor die and the second semiconductor die are included in a package.

6. The semiconductor device of claim 1, wherein
- the delay value comprises one of a factory-stored nonvolatile value and a user-provided nonvolatile value.

7. The semiconductor device of claim 1, further comprising:
- a delay measure circuit configured to measure the interconnect delay, wherein the delay measure circuit is further configured to
  - transmit a measurement signal to the host semiconductor device via the interconnect circuitry,
  - receive a delayed measurement signal from the host semiconductor device via the interconnect circuitry,
  - compare the measurement signal and the delayed measurement signal to determine a round-trip delay,
  - calculate the interconnect delay from the round-trip delay, and
  - output the delay value that indicates the interconnect delay to the clock delay circuit.

8. The semiconductor device of claim 7, wherein
- the delay measure circuit is configured to transmit the measurement signal on a loopback path that comprises a first path from an output of the delay measure circuit to the host semiconductor device that traverses the interconnect circuitry and a second path from the host semiconductor device to an input of the delay measure circuit that traverses the interconnect circuitry, and
- the delay measure circuit is configured to receive the delayed measurement signal from the second path.

9. The semiconductor device of claim 8, wherein
- the interconnect circuitry comprises a first set of transmit circuitry on the semiconductor device and a first set of receive circuitry on the host semiconductor device,
- the interconnect circuitry comprises a second set of transmit circuitry on the host semiconductor device and a second set of receive circuitry on the host semiconductor device,
- the first path of the loopback path traverses the first sets of transmit and receive circuitry,
- the first path is associated with a die-to-die delay,
- the second path of the loopback path traverses the second sets of transmit and receive circuitry, and
- the second path is associated with the die-to-die delay.

10. The semiconductor device of claim 8, wherein
- the interconnect circuitry comprises a level shifter,
- the interconnect delay comprises a delay associated with the level shifter,
- the first path and the second path of the loopback path each traverse the level shifter.

11. The semiconductor device of claim 8, wherein
- the interconnect circuitry comprises a first set of buffer elements associated with a first overall buffer delay,
- the loopback path traverses a second set of buffer elements associated with a second overall buffer delay, and
- the second overall buffer delay comprises twice the first overall buffer delay.

12. A method comprising:
- receiving a delay value associated with an interconnect delay, wherein
  - the interconnect delay is measured across interconnect circuitry that communicatively couples a host semiconductor device with a semiconductor device;
- delaying a local clock signal by an amount of delay indicated by the delay value to produce a delayed local clock signal, wherein
  - the local clock signal is generated on the semiconductor device;
- receiving a delayed source clock signal, wherein
  - the delayed source clock signal is received from the host semiconductor device via the interconnect circuitry; and
- outputting a master clock signal based on a comparison of the delayed source clock signal and the delayed local clock signal, wherein
  - the master clock signal is utilized to generate one or more aligned clock signals on the semiconductor device that are aligned with a source clock signal generated on the host semiconductor device.

13. The method of claim 12, further comprising:
- clocking synchronous logic with one of the one or more aligned clock signals, wherein
  - the synchronous logic is configured for synchronous communication with host synchronous logic in the host semiconductor device, and
  - the host synchronous logic is configured to utilize the source clock signal.

14. The method of claim 12, further comprising:
- generating one or more generated clock signals based on the master clock signal, wherein
  - the one or more generated clock signals include a first local delay introduced by the generating.

15. The method of claim 14, further comprising:
- distributing the one or more generated clock signals as one or more aligned clock signals to synchronous elements on the semiconductor device, wherein
  - the one or more aligned clock signals include a second local delay introduced by the distributing; and
- adjusting the master clock signal to compensate for the first local delay and the second local delay.

16. The method of claim 12, further comprising:
- measuring the interconnect delay, the measuring comprising:
  - transmitting a measurement signal to the host semiconductor device via the interconnect circuitry,
  - receiving a delayed measurement signal from the host semiconductor device via the interconnect circuitry,
  - comparing the measurement signal and the delayed measurement signal to determine a round-trip delay, calculating the interconnect delay from the round-trip delay, and outputting the delay value that indicates the interconnect delay to the clock delay circuit.

17. The method of claim 16, wherein the measurement signal is transmitted on a loopback path that comprises a first path from the semiconductor device to the host semiconductor device that traverses the interconnect circuitry and a second path from the host semiconductor device to the semiconductor device that traverses the interconnect circuitry, and the delayed measurement signal is received from the second path of the loopback path.

18. The semiconductor device of claim 17, wherein the interconnect circuitry comprises a first set of transmit circuitry on the semiconductor device and a first set of receive circuitry on the host semiconductor device, the interconnect circuitry comprises a second set of transmit circuitry on the host semiconductor device and a second set of receive circuitry on the host semiconductor device, the first path of the loopback path traverses the first sets of transmit and receive circuitry, the first path is associated with a die-to-die delay, the second path of the loopback path traverses the second sets of transmit and receive circuitry, and the second path is associated with the die-to-die delay.

19. The semiconductor device of claim 17, wherein the interconnect circuitry comprises a level shifter, the interconnect delay comprises a delay associated with the level shifter, the first path and the second path of the loopback path each traverse the level shifter.

20. The semiconductor device of claim 17, wherein the interconnect circuitry comprises a first set of buffer elements associated with a first overall buffer delay, the loopback path traverses a second set of buffer elements associated with a second overall buffer delay, and the second overall buffer delay comprises twice the first overall buffer delay.

21. A semiconductor device comprising:

a delay measure circuit configured to determine a round-trip delay based on a comparison of a measurement signal and a delayed measurement signal, wherein interconnect circuitry communicatively couples a host semiconductor device and the semiconductor device, the measurement signal is transmitted to the host semiconductor device via the interconnect circuitry, and the delayed measurement signal is received from the host semiconductor device via the interconnect circuitry, and calculate an interconnect delay of the interconnect circuitry based on the round-trip delay; and a clock alignment loop circuit configured to generate a local source clock signal on the semiconductor device, delay the local source clock signal by the interconnect delay to generate a delayed local source clock signal, receive a delayed host source clock signal, wherein the delayed host source clock signal is received from the host semiconductor device via the interconnect circuitry, and generate a master clock signal based on a comparison of the delayed local source clock signal and the delayed host source clock signal, wherein the master clock signal is utilized to generate an aligned local source clock signal that is aligned with a host source clock signal generated on the host semiconductor device.

22. A semiconductor device comprising:

an interconnect delay clock adjusting block configured to receive a delayed host source clock signal, wherein interconnect circuitry communicatively couples a host semiconductor device and the semiconductor device, and the delayed host source clock signal is received from the host semiconductor device via the interconnect circuitry, and output an intermediate clock signal based on the delayed host source clock signal;

an interconnect delay measure circuit configured to output a first control signal based on the intermediate clock signal and a comparison of a delayed measurement signal, wherein the delayed host source clock signal is immediately transmitted to the host semiconductor device via the interconnect circuitry as a measurement signal, the delayed measurement signal is received from the host semiconductor device via the interconnect circuitry, and the interconnect delay clock adjusting block is further configured to delay the intermediate clock signal based on the first control signal, and track an amount of delay introduced into the intermediate clock signal, and determine a delay code based on the amount of delay, wherein the delay code corresponds to an interconnect delay of the interconnect circuitry;

a combined delay clock adjusting block configured to adjust a local source clock signal based on the delay code to generate a delayed local source clock signal;

an on-chip delay measure circuit configured to output a second control signal based on a comparison of the delayed host source clock signal and the delayed local source clock signal; and an on-chip delay clock adjusting block configured to adjust the delayed host source clock signal based on the second control signal to output a master clock signal, wherein the master clock signal is utilized to generate an aligned local source clock signal that is aligned with a host source clock signal generated on the host semiconductor device.

\* \* \* \* \*